US012662017B2

(12) United States Patent
Kang

(10) Patent No.: US 12,662,017 B2
(45) Date of Patent: Jun. 23, 2026

(54) MANAGEMENT OF RECHARGEABLE ENERGY STORAGE SYSTEM HAVING CONSTRAINED POWER MODULE

(71) Applicant: GM GLOBAL TECHNOLOGY OPERATIONS LLC, Detroit, MI (US)

(72) Inventor: Jun-mo Kang, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 61 days.

(21) Appl. No.: 18/403,069

(22) Filed: Jan. 3, 2024

(65) Prior Publication Data

US 2025/0214485 A1 Jul. 3, 2025

(51) Int. Cl.
| | |
|---|---|
| *B60L 58/19* | (2019.01) |
| *B60L 1/00* | (2006.01) |
| *B60L 50/60* | (2019.01) |
| *B60L 58/22* | (2019.01) |
| *H02J 7/14* | (2006.01) |

(52) U.S. Cl.
CPC ................. *B60L 58/19* (2019.02); *B60L 1/00* (2013.01); *B60L 50/60* (2019.02); *B60L 58/22* (2019.02); *H02J 7/1423* (2013.01); *B60L 2240/545* (2013.01)

(58) Field of Classification Search
None
See application file for complete search history.

(56) References Cited

U.S. PATENT DOCUMENTS

| | | | | |
|---|---|---|---|---|
| 2013/0342167 A1* | 12/2013 | Bissontz | ................. | B60L 58/22 |
| | | | | 320/118 |
| 2016/0336767 A1* | 11/2016 | Zane | ...................... | H02J 7/0048 |
| 2018/0290544 A1 | 10/2018 | Long | | |
| 2020/0055405 A1* | 2/2020 | Duan | .................... | H02J 7/0014 |
| 2020/0223422 A1* | 7/2020 | Ye | ........................... | B60K 6/485 |
| 2022/0410716 A1* | 12/2022 | Thompson | ................ | B60L 1/00 |

FOREIGN PATENT DOCUMENTS

| | | |
|---|---|---|
| DE | 102017118610 A1 | 4/2018 |
| DE | 102019120882 A1 | 2/2020 |

* cited by examiner

*Primary Examiner* — Menatoallah Youssef
*Assistant Examiner* — Aqeel H Bukhari
(74) *Attorney, Agent, or Firm* — Quinn IP Law

(57) ABSTRACT

Management of rechargeable energy storage system (RESS) included onboard to a vehicle to provide a high voltage (HV) output to a HV bus and a low voltage (LV) output to a LV bus. The management may include identifying a constrained module of the power modules, determining a current demand for a low voltage (LV) bus of the vehicle, and implementing a compensation strategy for managing the power modules to meet the current demand, including lowering a current output set for the constrained module relative to current outputs set for the unconstrained modules.

20 Claims, 6 Drawing Sheets

MANAGEMENT OF RECHARGEABLE ENERGY STORAGE SYSTEM HAVING CONSTRAINED POWER MODULE

INTRODUCTION

The present disclosure relates to managing a rechargeable energy storage system (RESS) experiencing a constraining event, such as but not necessarily to managing output of a plurality of power modules of the RESS to account for the constraining event.

A rechargeable energy storage system (RESS) may be configured for storing and supplying electrical power for a wide variety of applications, with one of the more common types of RESSs including a plurality of energy cells arranged into one or more power modules. Such an RESS may be included onboard a vehicle to store and supply electrical power for a main or a high voltage (HV) bus and/or an auxiliary or a low voltage (LV) bus. To achieve and maintain desired levels of performance for the RESS, it may be advantageous for the power modules to operate in relatively balanced manner so that the demands placed thereupon may be spread across the power modules as equally as possible. The ability to equally spread the demand may become problematic in the event one or more of the power modules experiences a constraining event. The constraining event may correspond with an assortment of states, conditions, characteristics, parameters, and/or other influences acting upon or causing operation of the affected power module to be comparatively imbalanced relative to the other power modules. One type of constraining event may result from a temperature of one or more constrained power modules differing beyond a desirable amount from the temperature of the other power modules.

SUMMARY

One non-limiting aspect of the present disclosure relates to managing a rechargeable energy storage system (RESS) experiencing a constraining event, such as by minimizing or otherwise selectively managing demands placed upon the RESS to account for one or more power modules experiencing the constraining event. The constraining event may correspond with an assortment of states, conditions, characteristics, parameters, and/or other influences acting upon or causing operation of the affected power modules to be comparatively imbalanced relative to the other power modules. The management may be implemented according to a compensation strategy whereby operation of one or more unconstrained modules may be managed to compensate for the constrained modules. Upon identifying the constraining event to be related to a temperature of a constrained module undesirably differing from one or more unconstrainted modules, for example, the compensation strategy may be implemented to limit demands on the constrained module in a manner that allows its temperature to normalize toward the other power modules. Upon identifying the constraining event to be related to a constrained module experiencing an open circuit condition, such as in response to a fuse connected thereto transitioning to an opened state, for example, the compensation strategy may be implemented to eliminate demands on the constrained module.

One aspect of the present disclosure relates to a method for managing a plurality of power modules configured for storing and supplying electrical power onboard a vehicle. The method may include identifying a constrained module of the power modules, the constrained module being identified based on experiencing a constraining event sufficient to cause an operation thereof to be comparatively imbalanced relative to one or more unconstrained power modules of the power modules, determining a current demand for a low voltage (LV) bus of the vehicle, the current demand representing an amount of current demanded by LV systems connected to the LV bus, and implementing a compensation strategy for managing the power modules to meet the current demand, optionally with the compensation strategy including lowering a current output set for the constrained module relative to current outputs set for the unconstrained modules.

The method may include the compensation strategy controlling a plurality of power converters included as part of a distributed LV system onboard the vehicle, wherein each power converter is operable for converting the current output from a respective one or more of the power modules for distribution over the LV bus.

The method may include identifying the constrained module based on a temperature thereof exceeding a temperature threshold.

The method may include the compensation strategy setting the current output for the constrained power module to zero.

The method may include the compensation strategy setting the current output for the constrained power module to be greater than zero when the unconstrained modules are unable to meet the current demand.

The method may include the compensation strategy setting the current output for the constrained power module to be an amount greater than zero, optionally with the amount corresponding with a difference between a total current available from the unconstrained modules and the current demand.

The method may include identifying the constrained module based on a fuse connected thereto between a respective one of the power converters experiencing an open circuit condition.

The method may include the compensation strategy setting the current output for the constrained power module to zero.

The method may include the compensation strategy additionally limiting a current available to meet the current demand to an available amount of current capable of being provided from the unconstrained modules.

The method may include the compensation strategy including a model predictive controller (MPC) configured for selecting the current outputs for the power modules, optionally with the MPC deriving an optimal solution for managing the current outputs to meet the current demand via corresponding control of the power converters.

The method may include the MPC implementing an interpolation operation to facilitate deriving the optimal solution, optionally with the interpolation operation individually interpolating the current outputs for each of the power modules.

The method may include the compensation strategy including setting the current output for the constrained module to zero and the interpolation operation including deriving the optimal solution such that the current outputs for the unconstrained modules are selected to meet the current demand while relatively balancing a state of charge (SOC) of the unconstrained modules.

The method may include the power modules connecting in series to provide a high voltage (HV) electrical power to an electric motor operable for converter the HV electrical power to mechanical power operable for propelling the vehicle.

The method may include the power converters each including an input connected in parallel with a respective one of the power modules and an output connected together in parallel to provide an LV output to the LV bus.

One aspect of the present disclosure relates to a method for managing a rechargeable energy storage system (RESS) included onboard to a vehicle to provide a high voltage (HV) output to a HV bus and a low voltage (LV) output to a LV bus. The method may include plurality of power modules included as part of the RESS, the constrained module being identified based on experiencing a constraining event that comparatively imbalances an operation thereof relative to one or more unconstrained power modules of the power modules, determining a current demand for the LV output, and implementing a compensation strategy for managing the power modules to meet the current demand. The compensation strategy may include controlling a plurality of power converters included as part of the RESS to control a current output for a respective one of the power modules for distribution over the LV bus, optionally including restricting the current output set for the constrained module relative to the current outputs set for the unconstrained modules such that the current outputs of the unconstrained modules are greater than the current output of the constrained module.

The method may include identifying the constrained module based on a temperature thereof exceeding a temperature threshold.

The method may include reclassifying the constrained module as one of the unconstrained modules in response to the temperature thereof dropping below the temperature threshold, and relatedly thereafter, implementing a balance strategy for managing the power modules to meet the current demand, optionally with the balance strategy setting the current outputs individually for the power modules according to an optimal solution interpolated for relatively balancing a state of the power modules.

The method may include identifying the constrained module based on a fuse connected thereto between a respective one of the power converters experiencing an open circuit condition.

The method may include the compensation strategy including setting the current output for the constrained module to zero and the current outputs of the unconstrained modules to meet the current demand while relatively balancing a state of charge (SOC) of the unconstrained modules.

One aspect of the present disclosure relates to a vehicle. The vehicle may include an electric motor configured for converting high voltage (HV) electrical power to mechanical power suitable for use in propelling the vehicle, a low voltage (LV) bus operable for distributing LV electrical power to one or more loads onboard the vehicle, and a rechargeable energy storage system (RESS) operable for providing the HV electrical power to the electric motor and the LV electrical power to the LV bus. The RESS may include a plurality of energy cells arranged into a plurality of power modules, wherein each of the power modules collectively connect together in series and individually in parallel with a respective one of a plurality of power converters, optionally with the power converters being operable for controlling current output to the LV bus for the battery module connected thereto. The vehicle may further include a controller configured for identifying one or more constrained modules of the power modules to be operating at a temperature greater than a temperature threshold, determining a current demand for the LV bus, and implementing a compensation strategy for managing the power modules to meet the current demand, optionally with the compensation strategy including setting the current output for the constrained modules to zero and the current outputs for the remaining modules to compensate for the current output of the constrained modules being set to zero.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

DETAILED DESCRIPTION

As required, detailed embodiments of the present disclosure may be disclosed herein; however, it may be understood that the disclosed embodiments may be merely exemplary of the disclosure that may be embodied in various and alternative forms. The figures may not be necessarily to scale; some features may be exaggerated or minimized to show details of particular components. Therefore, specific structural and functional details disclosed herein may need not to be interpreted as limiting, but merely as a representative basis for teaching one skilled in the art to variously employ the present disclosure.

Figure 1:
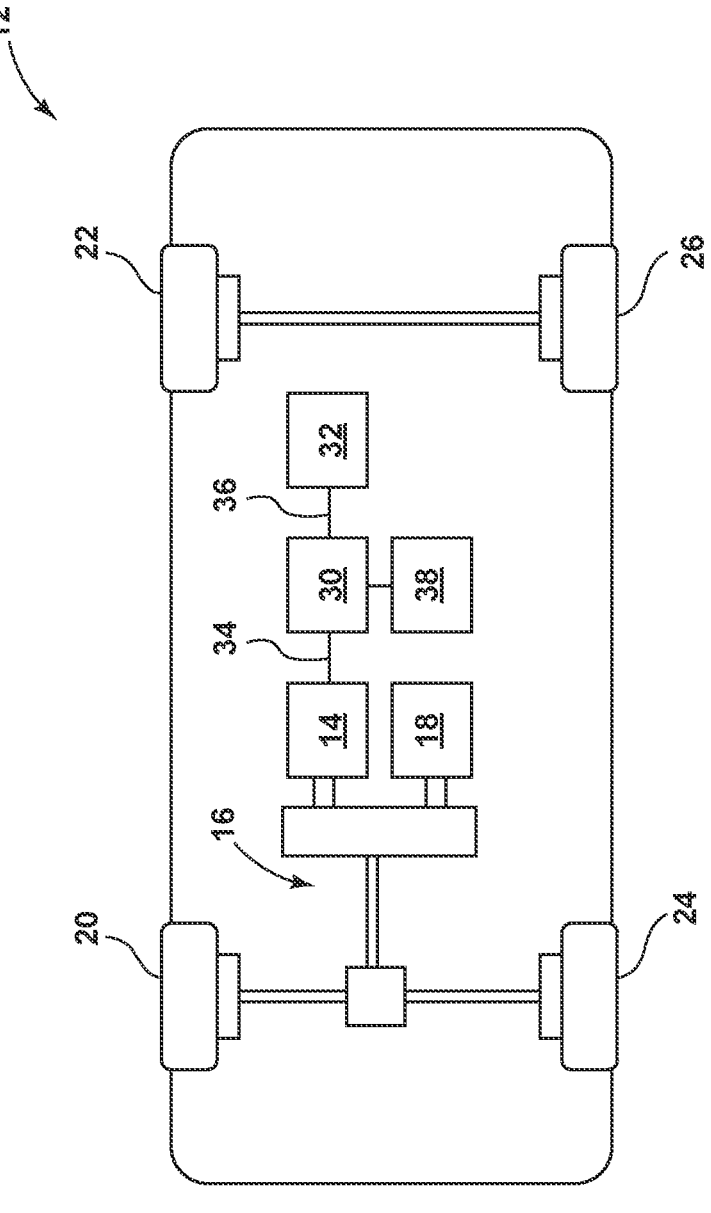
FIG. 1 illustrates a vehicle in accordance with one non-limiting aspect of the present disclosure.

FIG. 1 illustrates a vehicle 12 in accordance with one non-limiting aspect of the present disclosure. The vehicle 12, which may be interchangeable referred to as an electric or hybrid vehicle 12, may include a traction motor 14 operable for converting electrical power to mechanical power for purposes of performing work, such as for mechanically powering a drivetrain 16 to propel the vehicle. The vehicle 12 is illustrated as a hybrid type due to the powertrain 16 optionally including an internal combustion engine (ICE) 18 for generating mechanical power. The powertrain 16 may include componentry to facilitate conveying rotative force from the traction motor 14 and/or the ICE 18 to one or more of the wheels 20, 22, 24, 26. The vehicle 12 may include a rechargeable energy storage system (RESS) 30 configured to store and supply electrical power for the traction motor 12 and/or other components, systems, etc. onboard the vehicle 12, such as via a first bus 34 and a second bus 36. The vehicle 12 may include a vehicle controller 38 to facilitate monitoring, controlling, measuring, and otherwise directing operation, performance, etc. onboard the vehicle 12, which may include performing measurements, taking readings, or otherwise collecting data to facilitate diagnosing constraining events and correspondingly managing the RESS 30 to mitigate the influence thereof while maintaining operation of the RESS 30 within defined operating boundaries.

Figure 2:
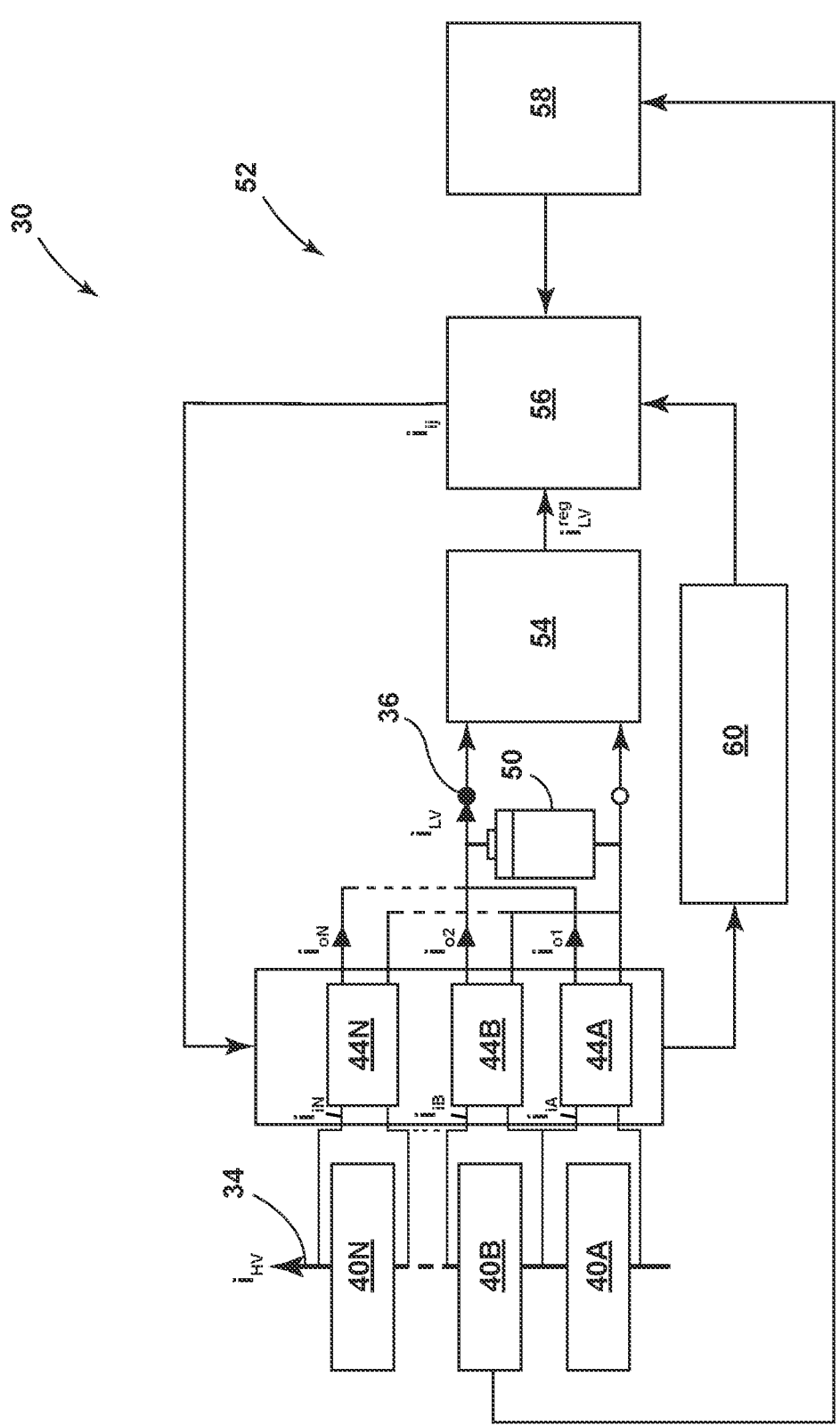
FIG. 2 illustrates a partial schematic view of a rechargeable energy storage system (RESS) in accordance with one non-limiting aspect of the present disclosure.

FIG. 2 illustrates a partial schematic view of the RESS 30 in accordance with one non-limiting aspect of the present disclosure. The RESS 30 may include a plurality of energy sources, cells, or other storage units (not shown) arranged into a plurality of power modules, packs, or other groupings 40A, 40B, 40N. The present disclosure contemplates the power modules 40A, 40B, 40N being comprised of a wide variety of components operable for storing and supplying electrical power. The power modules 40A, 40B, 40N, for example, may include various combinations of battery cells, battery packs, capacitors, supercapacitors, fuel cells, or other types of energy components operable for storing and supplying electrical power. While the present disclosure fully contemplates the management described herein being useful in other environments and for other systems, the described use with the vehicle 12 may be particularly advantageously due to the relatively high power demands and long term operating requirements of the vehicle 12 causing the RESS 30 to benefit from minimizing operational differences and imbalances between the power modules 40A, 40B, 40N that may arise from such prolonged use. Accordingly, in an effort to achieve and maintain desired levels of performance for the RESS 30, it may be advantageous for the power modules 40A, 40B, 40N to operate in relatively balanced manner so that the demands placed thereupon may be spread across the power modules 40A, 40B, 40N as equally as possible.

The RESS 30 is shown for exemplary purposes as including the power modules 40A, 40B, 40N connecting together in series such that the series connection may be operable to provide a main or a high voltage (HV) output $i_{HV}$ to the first bus 34, which may be correspondingly referred to as a main or HV bus 34. The RESS 30 is also shown for exemplary purposes as including the power modules 40A, 40B, 40N individually connected in parallel with one of a plurality of power converters 44A, 44B, 44N. The power converters 44A, 44B, 44N may be comprised of power electronics capable of controlling power exchange with the modules 40A, 40B, 40N associated therewith, optionally with each power converter 44A, 44B, 44N including an input and an output, which may be interchangeable or reversible. The power converters 44A, 44B, 44N, for example, may be unidirectional or bidirectional direct current (DC) to DC (DC-DC) converters 44A, 44B, 44N connected in the illustrated manner such that the inputs connect in parallel with one or more of the modules 40A, 40B, 40N and the outputs connect together in parallel to provide an auxiliary or a low voltage (LV) output $i_{LV}$ to the second bus 36, which may be correspondingly referred to as an auxiliary or LV bus 36. The power modules 40A, 40B, 40N and the power converters 44A, 44B, 44N associated therewith may together form individual power conversion systems 46, i.e., one power conversion system 46 for each power module 40A, 40B, 40N and power converter 44A, 44B, 44N 44 combination.

The first and second buses 34, 36 are shown to be separate for illustrative purposes as the present disclosure fully contemplates the buses 34, 36 being joined or connected together and/or one bus 34, 36 being used to provide or exchange electrical power with the other bus 34, 36 or additional buses (not shown). The LV bus 36, for example, may be operable to supply electrical power to the HV bus 34, such as with an LV energy source 50 (e.g., LV battery, faster, etc.) operable for storing and supplying LV power to the LV bus 36. The vehicle 12 may include a plurality of LV systems (not shown) electrically connected to the LV bus 36 and additional HV systems (not shown) electrically connected to the HV bus 36. The RESS 30 may include a control system 52 for facilitating operation thereof, which for exemplary purposes is shown to include a low voltage regulator, a model predictive controller (MPC) 56, a state estimator 58, and a sensor system 60. The control system 52 may be included as part of the control 38 and/or portion thereof may be included as part of other hardware and/or software. The control system 52 may operate according to one or more processors executing one or more sets of non-transitory instructions stored on one or more computer-readable storage mediums.

The LV regulator 54, state estimator 58, and the sensor system 60 may be operable for performing diagnostics and otherwise monitoring the power modules 40A, 40B, 40N, the power converters 44A, 44B, 44N, the LV bus 36, the LV energy source, the LV loads, HV bus, and/or other systems and/or influences associated with demands placed upon the RESS 30. The LV regulator 54 may be configured for determining a current demand for the LV bus 36, such as based on demands made by the LV systems, the LV energy source 50, and/or other loads associated with the LV bus 36. The LV regulator 54 may include capabilities for communicating with or otherwise assessing the loads on the LV bus 36. The LV regulator 54, for example, may be configured for collecting corresponding information to determine a current demand $i_{LV}$ for the LV bus 36. The current demand $i_{LV}$ may represent an amount of current demanded or a total current being requested or needed in summation for the LV systems and/or other loads connected to the LV bus 36. The LV regulator 54 may correspondingly generate an intermediate LV regulator 54 current $i_{LV}^{reg}$ corresponding to desired total sum of individual input currents of power modules 40A, 40B, 40N to regulate voltage of LV bus to a set point for use by the MPC 56 in calculating individual input currents $i_{i1}$, $i_{i2}$, $i_{iN}$ for the power modules 40A, 40B, 40N, which may be implemented by the MPC 56 or other controller generating associated instructions for directing related operation of the respective power converters 44A, 44B, 44N. In other words, the MPC 56 may be configured for assessing the current demand $i_{LV}$ and correspondingly managing the current outputs $i_{O1}$, $i_{O2}$, $i_{ON}$ of the power modules 40A, 40B, 40N through related control of the power converters 44A, 44B, 44N such that output currents $i_{O1}$, $i_{O2}$, $i_{ON}$ of the power modules 40A, 40B, 40N achieves voltage of the LV bus to be the set point.

The MPC 56 may be operable for implementing a variety of control strategies for controlling operation of the RESS 30 according to various performance, design, or other operating characteristics. The MPC 56 may utilize sensor data collected with the sensor system 60 and state data collected with the state estimator 58 to facilitate selecting and implementing desirable one of the control strategies. The sensor system 60, for example, may be configured to include current, voltage, temperature and/or sensors for directly or sensing related metrics or the power modules 40A, 40B, 40N, the power converters 44A, 44B, 44N, and/or other componentry of the RESS 30. The state estimator 58, for example, may be configured for determining a state for the power modules 40A, 40B, 40N, the power converters 44A, 44B, 44N, and/or other componentry of the RESS 30, which may include determining a state of charge (SOC), a state of health (SOH), state of energy (SOE), state of power (SOP), etc. for the power modules 40A, 40B, 40N. The MPC 56 may utilize this information to determine whether the power modules 40A, 40B, 40N may be operating in a comparatively balanced or unbalanced manner. The balanced manner may correspond with the power modules 40A, 40B, 40N operating in a similar manner with respect to temperature, efficiency, stated charge, etc. such that the current demand may be relatively equally spread across the power modules 40A, 40B, 40N without unduly stressing or disparately overworking one power module 40A, 40B, 40N more than another.

When the power modules 40A, 40B, 40N are operating in a relatively balanced or even manner, the MPC 56 may be configured for implementing a balance control strategy whereby the power converters 44A, 44B, 44N may be relatedly controlled to control the current outputs such that the SOC or other basis used for assessing balance may be relatively normalized across the power modules 40A, 40B, 40N, i.e., the power modules 40A, 40B, 40N may be correspondingly managed such that the SOC of each is within a predefined range to each other so that the respective SOCs may be considered to be normalized or balanced. The MPC 56 may be operable for correspondingly generating desired currents $i_{ij}$ for each of the power converters 44A, 44B, 44N to be used in controlling the respective power converter 44A, 44B, 44N to generate corresponding the desired current output for the associated power module 40A, 40B, 40N. The MPC 56 may include processing capabilities sufficient for determining the desire currents $i_{ij}$ in concert with or with a similar speed at which the LV regulator 54 generates the intermediate LV regulator 54 current $i_{LV}^{reg}$. The MPC 56 may optionally lack the processing capabilities and/or speed of the LV regulator 54 and/or it may be desirable to use less computationally restrictive methods for determining the desire currents $i_{ij}$, such as through implementation of an interpolation operation.

Figure 3:
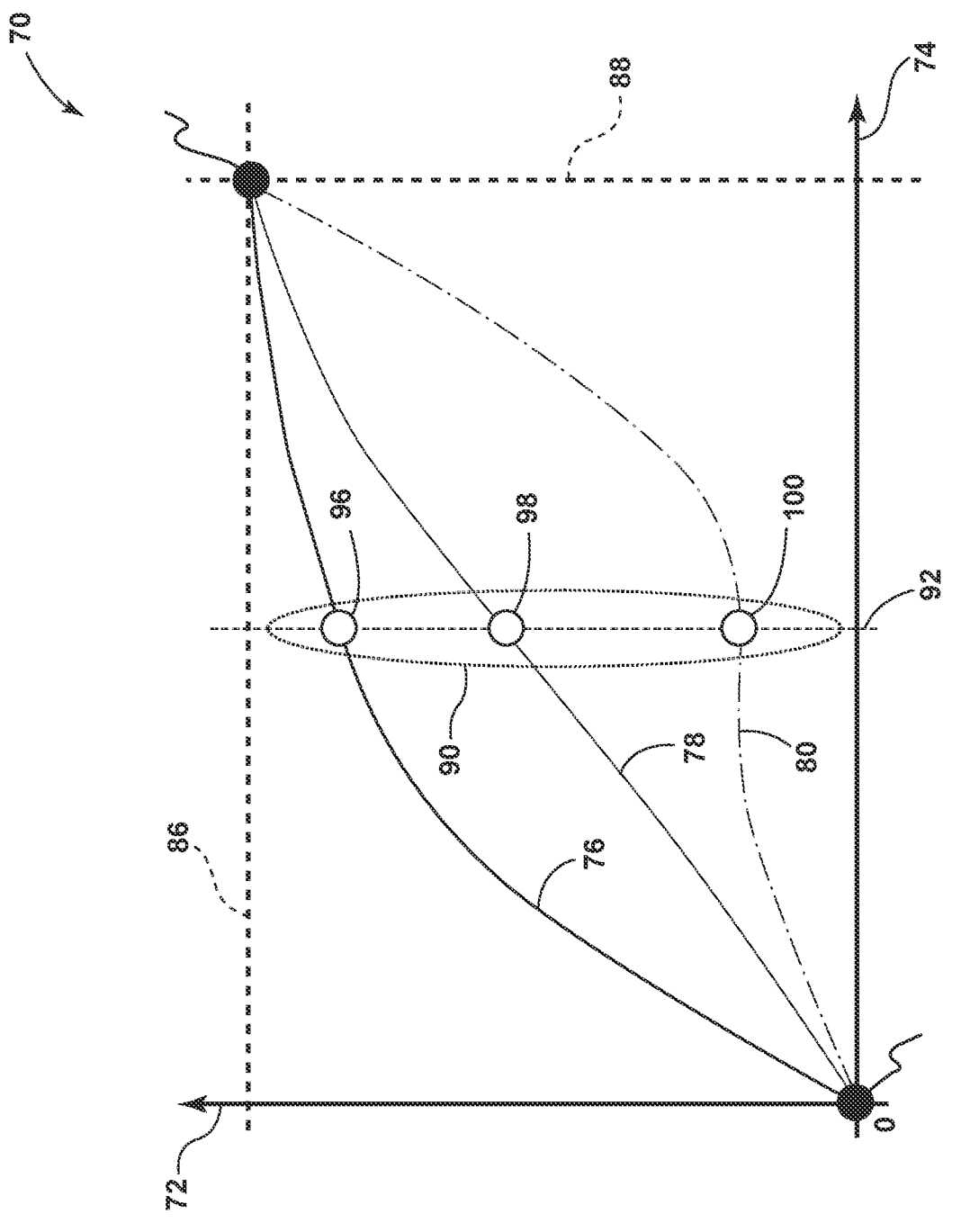
FIG. 3 illustrates a graph for the interpolation operation in accordance with one non-limiting aspect of the present disclosure.

FIG. 3 illustrates a graph 70 for the interpolation operation in accordance with one non-limiting aspect of the present disclosure. The graph 70 may include a vertical axis 72 representing the desire currents $i_{ij}$ and a horizontal axis 74 representing the intermediate LV regulator 54 current $i_{LV}^{reg}$. The graph 70 may include a curve 76, 78, 80 for each of the power modules 40A, 40B, 40N, which is shown to include a first curve 76 for the first power module 40A, a second curve 78 for the second power module 40B, and a third curve 80 for the third power module 40N. This exemplary description of the RESS 30 including three power modules 40A, 40B, 40N is presented for non-limiting purposes as the third power module 40N is intended to represent an Nth power module such that the RESS 30 may include more or less than the three illustrated power modules 40A, 40B, 40N, with the graph 70 correspondingly including curves for each. A horizontal line 86 may represent a maximum current available from each of the power modules 40A, 40B, 40N, and a vertical line 88 may represent a total maximum current available from the power modules 40A, 40B, 40N for distribution to the LV bus 36. The MPC 56 may utilize the intermediate LV regulator 54 current $i_{LV}^{reg}$ to generate an optimal solution 90 to regulate voltage of the LV bus to a set point, e.g., for meeting the associated current demand $i_{LV}$.

In the illustrated example, the intermediate LV regulator 54 current $i_{LV}^{reg}$ may be less than the total maximum current available from the power modules 40A, 40B, 40N such that the desired currents $i_{ij}$ for each power module 40A, 40B, 40N may be interpolated based on indexing the corresponding curve relative to a value 92 calculated for the intermediate LV regulator 54 current $i_{LV}^{reg}$. This implementation of the balanced control strategy may result in determining a first desired current $i_{ij}$ 96 for the first power module 40A, 40B, 40N, a second desired current $i_{ij}$ 98 for the second power module 40A, 40B, 40N, and a third desired current $i_{ij}$ 100 for the third power module 40A, 40B, 40N. While the first, second, and third desired currents $i_{ij}$ 96, 98, 100 may be shown to be slightly different from each other, the corresponding values may be selected based on a balancing parameter, e.g., SOC, such that the resulting optimal solution 90 meets the current demand $i_{LV}$ of the LV bus 36, i.e., with the power modules 40A, 40B, 40N providing the current outputs $i_{O1}$, $i_{O2}$, $i_{ON}$ to regulate voltage of the LV bus while balancing SOC levels.

When the power modules 40A, 40B, 40N may be operating in a relatively unbalanced or uneven manner, the MPC 56 may be configured for implementing a compensation strategy whereby the power converters 44A, 44B, 44N may be relatedly controlled to compensate for the imbalance. One non-limiting aspect of the present disclosure contemplates such an imbalance arising when one or more of the power modules 40A, 40B, 40N may be experiencing a constraining event. For the sake of presentation simplicity, the constraining event is predominately described with respect to influencing operation of one power module 40A, 40B, 40N, however, as one skilled in the art would readily appreciate, the present disclosure may be equally applicable to multiple power modules 40A, 40B, 40N experiencing the same and/or different constraining event. The constraining event may correspond with an assortment of states, conditions, characteristics, parameters, and/or other influences acting upon or causing operation of the affected power modules 40A, 40B, 40N to be comparatively imbalanced relative to the other power modules 40A, 40B, 40N. in the illustrated example, the power module 40N experiencing the constraining event may be referred to as a constrained module 40N, and the remaining power modules 40A, 40B unaffected by the constraining event or operating within a balanced manner relative to each other may be referred to as unconstrained modules 40A, 40B.

Figure 4:
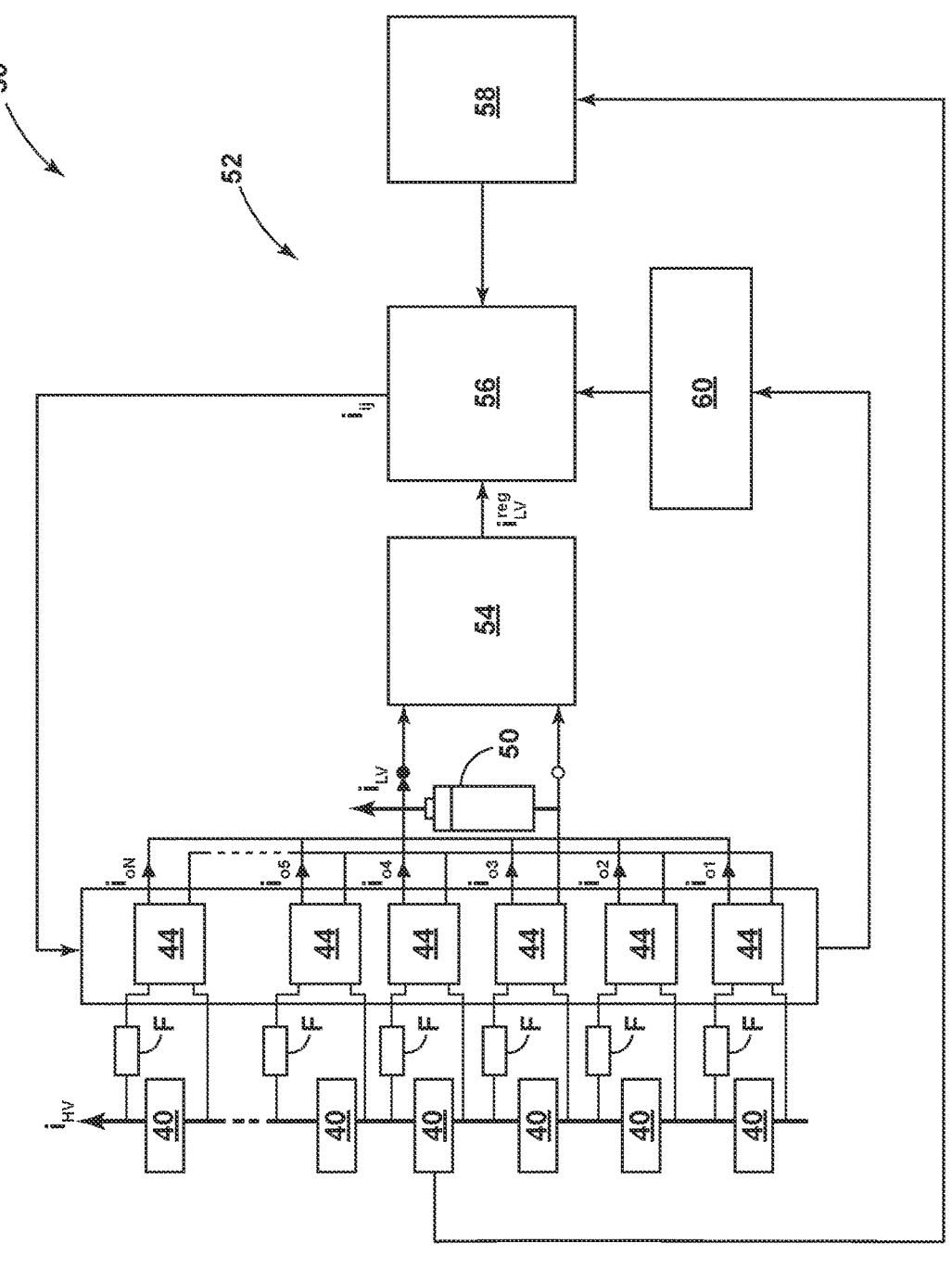
FIG. 4 illustrates a partial schematic view of the RESS including a plurality of fuses in accordance with one non-limiting aspect of the present disclosure.

The MPC 56 may assess operational differences between the constrained module 40N and the unconstrained modules 40A, 40B, and based thereon, implement the compensation strategy to manage the constrained and unconstrained modules 40A, 40B to account for the constrained module 40N. The constrained event may result from a temperature of the constrained module 40N exceeding a temperature threshold and the remaining, unconstrained modules 40A, 40B operating below the temperature threshold. FIG. 4 illustrates a partial schematic view of the RESS 30 including a plurality of fuses F in accordance with one non-limiting aspect of the present disclosure whereby an associated constraining event may correspond with or more the fuses F experiencing an open circuit condition. The open circuit condition may result from the respective fuse F transitioning from a closed state to an open state, such as in response to a transitional trigger of the fuse being surpassed, e.g., a temperature, current, voltage, other threshold of the fuse being exceeded. The fuses may be disposed between the power modules 40 and a respective one of the power converters 44 in a manner that results in the associated power module 40 being unable to provide current to the corresponding power converter 44 when the open circuit condition is determined.

Figure 5:
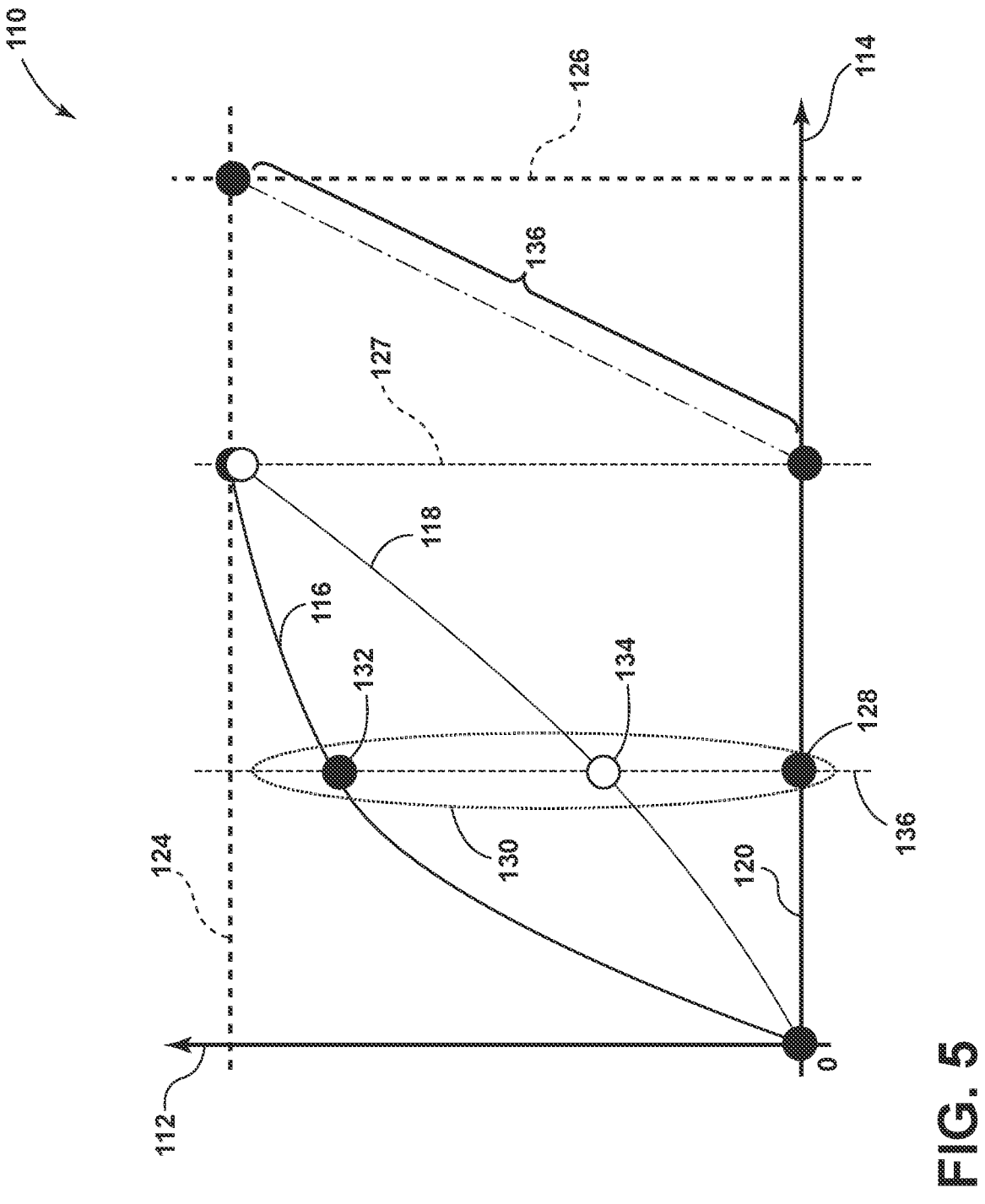
FIG. 5 illustrates a graph for implementing the compensation strategy in accordance with one non-limiting aspect of the present disclosure.

The constraining events may correspond with undesirable performance, e.g., with the constrained module 40N operating a temperature above a temperature threshold, or interoperability, e.g., with the constrained module 40N they connected to a fuse experiencing an open circuit condition. The noted constraining events are described for non-limiting purposes as the present disclosure fully contemplates a wide variety of constraining events influencing operation of the power modules 40A, 40B, 40N in a manner that may benefit from the management described herein. Upon determining the constrained module 40N, the MPC 56 may implement the compensation strategy to manage the constrained and unconstrained modules 40A, 40B, which may optionally include selecting the desired currents $i_{ij}$, i.e. the resulting current outputs $i_{O1}$, $i_{O2}$, $i_{ON}$ for each of the power modules 40A, 40B, 40N, to ameliorate the effects of the constraining event upon the constrained module 40N. FIG. 5 illustrates a graph 110 for implementing the compensation strategy in accordance with one non-limiting aspect of the present disclosure. The graph 110 may include a vertical axis 112 representing the desired currents $i_{ij}$ and a horizontal axis 114 representing the intermediate LV regulator 54 current $i_{LV}^{reg}$. The graph 110 may include a curve 116, 118, 120 for each of the power modules 40A, 40B, 40N, which is shown to include a first curve 116 for the first power module 40A, a second curve 118 for the second power module 40B, and a third curve 120 for the third power module 40N. A horizontal line 124 may represent a maximum current available from each of the power modules 40A, 40B, 40N, a vertical line 126 may represent a total maximum current available from the power modules 40A, 40B, 40N for distribution to the LV bus 36, and a vertical line 127 may represent a total maximum current available from the unconstrained modules 40A, 40B.

The third curve 120 may be shaped differently relative to the third curve 80 shown in FIG. 3 to represent the compensation being undertaken to account for the constraining event influencing operation of the third power module 40N. The illustrated representation corresponds with driving the desired current $i_{ij}$ 128, i.e., the current output $i_{ON}$ for the third power module 40N, to zero. The driving of the desired current $i_{ij}$ to zero may be advantageous in preventing the third power module 40N from providing current, which may be advantageous in accounting for the open circuit condition and/or to allow the temperature to decrease below the temperature threshold. The MPC 56 may utilize the intermediate LV regulator 54 current $i_{LV}^{reg}$ to generate an optimal solution 130 for meeting associated current demand while accounting for the constrained module 40N. The MPC 56 may be configured for relatedly determining the desire currents $i_{ij}$ 132, 134 for the unconstrained modules 40A, 40B in a manner similar to that described above, i.e., according to an interpolation operation whereby the desired currents $i_{ij}$ 132, 134 for each of the unconstrained modules 40A, 40B may be determined based on the optimal solution 130 derived from a value 136 for the intermediate LV regulator 54 current $i_{LV}^{reg}$. The corresponding values may be selected based on a balancing parameter, e.g., SOC, such that the resulting optimal solution 130 meets the current demand $i_{LV}$ of the LV bus 36 in a balanced manner, i.e., with the unconstrained modules 40A, 40B providing the current outputs $i_{O1}$, $i_{O2}$ at relatively equal SOC levels.

In the event the current demand $i_{LV}$ of the LV bus 36 exceeds the capabilities of the unconstrained modules 40A, 40B, the compensation strategy may, as shown, include setting the third current demand $i_{ij}$ 128, i.e., the current output $i_{ON}$ for the constrained power module 40N, to be an amount greater than zero. The amount may be proportional to a difference between a total current available from the unconstrained modules 40A, 40B and the current demand $i_{LV}$, which may corresponding with a proportional increase corresponding with a slope portion 136 of the third curve 120. The compensation strategy may in this manner permit the constrained module 40N to be utilized in the event the unconstrained modules 40A, 40B are unable to meet demand. The capability to lower the current output of the constrained module 40N relative to the unconstrained module 40N, optionally with driving the current output to zero when the unconstrained modules 40A, 40B are able to meet demand, may be beneficial in allowing the constrained module 40N to cool when reasonable. In the event the constrained module 40N cools to temperature below the temperature threshold, the compensation strategy may be ceased. In the event the constraining event resulted from the open circuit condition, the hold the current output of the constrained module 40N to zero such that the current made available to the LV bus 36 may be limited to an amount of current 127 capable of being provided by from the unconstrained modules 40A, 40B.

Figure 6:
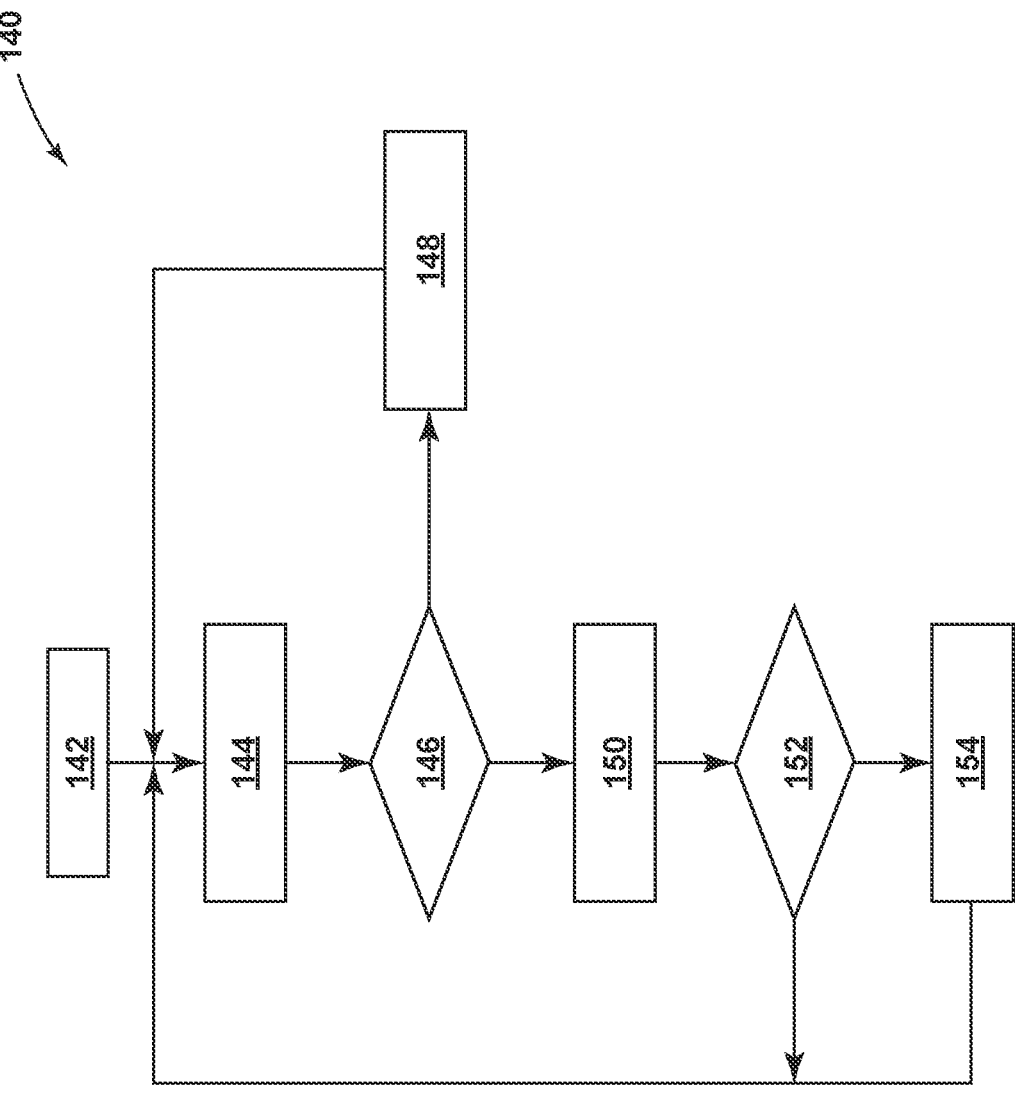
FIG. 6 illustrates a flowchart of a method for managing operation of the power modules the course with one non-limiting aspect of the present disclosure.

FIG. 6 illustrates a flowchart 140 of a method for managing operation of the power modules 40A, 40B, 40N the course with one non-limiting aspect of the present disclosure. Block 142 relates to the LV regulator 54 performing a demand process to determine a current demand for the LV bus 36. Block 144 relates to the sensor system 60 determining a temperature threshold or other parameter sufficient for assessing whether one or more of the modules 40A, 40B, 40N may be experiencing a constraining event. Block 146 relates to the MPC 56 performing a constrained process for identifying a constrained module 40N of the power modules 40A, 40B, 40N. The constrained module 40N may be identified based on experiencing a constraining event sufficient to cause and operation thereof to be comparatively imbalanced relative to one or more unconstrained power modules 40A, 40B, 40N of the power modules 40A, 40B, 40N. Block 148 relates to the MPC 56 implementing a balanced strategy to meet the demands placed on the power modules 40A, 40B, 40N in the absence of constraining events, which may include implementing the above-described balanced strategy and/or another strategy suitable for operating the power modules 40A, 40B, 40N in a relatively unconstrained manner. Block 150 relates to the MPC 56 implementing a compensation strategy in response to determining one or more of the power modules 40A, 40B, 40N to be constrained, i.e., affected by a constraining event. The compensation strategy, for example, may include lowering a current output set for the constrained module 40N relative to the current output set for the unconstrained modules 40A, 40B, optionally including setting the current output to zero. Block 152 relates to the MPC 56 performing adjustment process whereby an assessment may be made as to whether the unconstrained modules 40A, 40B may be capable of meeting the current demand. Block 154 may relate to an adjustment process the MPC 56 may implement in response to the unconstrained modules 40A, 40B being unable to meet the current demand. The adjustment process may include the MPC 56 adjusting the current limitations placed upon the constrained module 40N, which may optionally include proportionally increasing the current made available from the constrained module 40N.

As supported above, the present disclosure relates to a control strategy that may provide automatic control of a distributed LV system with thermal management, real time constraints on current control to avoid stress to the system, active temperature balancing through distribution of current command to DC converters, and/or real time interpolation of optimal control law to achieve near optimal balancing performance when thermal imbalance is detected. The controller strategy may regulate the input or output ports of the converters differentially through a thermal or electrical constraint. Multiple unidirectional DC converters in distributed low voltage system may be coordinated through an optimal controller which employs a mathematical model of the system. The controller may minimize the SOC balancing discrepancies while meeting constraints to avoid over stress to battery modules and DC converters. The controller may be beneficial in reducing thermal deviation among converters by incorporating estimated or measured temperature and constraining individual currents of the converters. The control strategy may distribute currents of DC converters to minimize temperature imbalance with strict constraints for damage avoidance and/or to protect an overheated converter. A voltage regulator may be utilized to minimize low voltage deviation due to load current. A real time interpolation of optimal current of individual DC converters may include current demand from the low voltage regulator when thermal problem is detected.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for managing a plurality of power modules configured for storing and supplying electrical power onboard a vehicle, the method comprising:
  identifying a constrained module of the power modules, the constrained module being identified based on experiencing a constraining event sufficient to cause an operation thereof to be comparatively imbalanced relative to one or more unconstrained power modules of the power modules;
  determining a current demand for a low voltage (LV) bus of the vehicle, the current demand representing an amount of current demanded by LV systems connected to the LV bus; and
  implementing a compensation strategy for managing the power modules to meet the current demand, the compensation strategy including lowering a current output set for the constrained module to zero.

2. The method according to claim 1, further comprising: the compensation strategy including controlling a plurality of power converters included as part of a distributed LV system onboard the vehicle, wherein each power converter is operable for converting the current output from a respective one or more of the power modules for distribution over the LV bus.

3. The method according to claim 1, further comprising: identifying the constrained module based on a temperature thereof exceeding a temperature threshold.

4. The method according to claim 1, further comprising: the compensation strategy setting the current output for the constrained power module to be greater than zero while the unconstrained modules are unable to meet the current demand.

5. The method according to claim 1, further comprising: the compensation strategy setting the current output for the constrained power module to be an amount greater than zero, the amount corresponding with a difference between a total current available from the unconstrained modules and the current demand.

6. The method according to claim 2, further comprising: identifying the constrained module based on a fuse connected thereto between a respective one of the power converters experiencing an open circuit condition.

7. The method according to claim 6, further comprising: the compensation strategy additionally limiting a current available to meet the current demand to an available amount of current capable of being provided from the unconstrained modules.

8. The method according to claim 2, further comprising: the compensation strategy including a model predictive controller (MPC) configured for selecting the current outputs for the power modules, the MPC deriving an optimal solution for managing the current outputs to meet the current demand via corresponding control of the power converters.

9. The method according to claim 8, further comprising: the MPC implementing an interpolation operation to facilitate deriving the optimal solution, the interpolation operation individually interpolating the current outputs for each of the power modules.

10. The method according to claim 9, wherein: the interpolation operation includes deriving the optimal solution such that the current outputs for the unconstrained modules are selected to meet the current demand while relatively balancing a state of charge (SOC) of the unconstrained modules.

11. The method according to claim 9, further comprising: the power modules connecting in series to provide a high voltage (HV) electrical power to an electric motor operable for converter the HV electrical power to mechanical power operable for propelling the vehicle.

12. The method according to claim 11, further comprising: the power converters each including an input connected in parallel with a respective one of the power modules and an output connected together in parallel to provide an LV output to the LV bus.

13. A method for managing a rechargeable energy storage system (RESS) included onboard to a vehicle to provide a high voltage (HV) output to a HV bus and a low voltage (LV) output to a LV bus, the method comprising:
  identifying a constrained module of a plurality of power modules included as part of the RESS, the constrained module being identified based on experiencing a constraining event that comparatively imbalances an operation thereof relative to one or more unconstrained power modules of the power modules;
  determining a current demand for the LV output; and implementing a compensation strategy for managing the power modules to meet the current demand, the compensation strategy including controlling a plurality of power converters included as part of the RESS to control a current output for a respective one of the power modules for distribution over the LV bus, including restricting the current output set for the constrained module to zero.

14. The method according to claim 13, further comprising:

identifying the constrained module based on a temperature thereof exceeding a temperature threshold.

15. The method according to claim 14, further comprising:

reclassifying the constrained module as one of the unconstrained modules in response to the temperature thereof dropping below the temperature threshold, and relatedly thereafter, implementing a balance strategy for managing the power modules to meet the current demand, the balance strategy setting the current outputs individually for the power modules according to an optimal solution interpolated for relatively balancing a state of the power modules.

16. The method according to claim 13, further comprising:

identifying the constrained module based on a fuse connected thereto between a respective one of the power converters experiencing an open circuit condition.

17. The method according to claim 13, further comprising:

the compensation strategy including setting the current outputs of the unconstrained modules to meet the current demand while relatively balancing a state of charge (SOC) of the unconstrained modules.

18. A vehicle, comprising:

an electric motor configured for converting high voltage (HV) electrical power to mechanical power suitable for use in propelling the vehicle;

a low voltage (LV) bus operable for distributing LV electrical power to one or more loads onboard the vehicle;

a rechargeable energy storage system (RESS) operable for providing the HV electrical power to the electric motor and the LV electrical power to the LV bus, the RESS including a plurality of energy cells arranged into a plurality of power modules, wherein each of the power modules collectively connect together in series and individually in parallel with a respective one of a plurality of power converters, wherein the power converters are operable for controlling current output to the LV bus for the power module connected thereto; and a controller configured for:

identifying one or more constrained modules of the power modules to be operating at a temperature greater than a temperature threshold;

determining a current demand for the LV bus; and implementing a compensation strategy for managing the power modules to meet the current demand, the compensation strategy including setting the current output for the constrained modules to zero and the current outputs for the remaining modules to compensate for the current output of the constrained modules being set to zero.

19. The vehicle according to claim 18, wherein:

the compensation strategy sets the current output for the constrained power module to be greater than zero while the unconstrained modules are unable to meet the current demand.

20. The vehicle according to claim 18, wherein:

the constrained module is identified based on a fuse connected thereto between a respective one of the power converters experiencing an open circuit condition.

* * * * *